United States Patent [19]

Kendall, Jr.

[11] 4,313,745
[45] Feb. 2, 1982

[54] METHOD OF FORMING FROZEN SPHERES IN A FORCE-FREE DROP TOWER

[76] Inventor: Alan M. Lovelace, Acting Administrator of the National Aeronautics and Space Administration, with respect to an invention of James M. Kendall, Jr., Pasadena, Calif.

[21] Appl. No.: 219,680
[22] Filed: Dec. 24, 1980
[51] Int. Cl.³ ............................................. C03B 19/10
[52] U.S. Cl. ....................................... 65/21.4; 65/22; 65/142; 264/5; 425/6
[58] Field of Search .......................... 65/21.4, 22, 142; 264/5; 425/6

[56] References Cited

U.S. PATENT DOCUMENTS

| | | |
|---|---|---|
| 2,738,548 | 3/1956 | Kassel . |
| 3,059,280 | 10/1962 | Laehder . |
| 3,133,805 | 5/1964 | Robinson . |
| 3,331,898 | 7/1967 | Haas et al. . |
| 4,058,386 | 11/1977 | Faulkner . |
| 4,190,622 | 2/1980 | Landis . |
| 4,279,632 | 7/1981 | Wang et al. .......................... 65/21.4 |

FOREIGN PATENT DOCUMENTS 53-197802  2/1978  Japan .................................. 65/21.4

OTHER PUBLICATIONS

Controlling the Shape of Glass Microbaloons, NASA Tech. Briefs, vol. 5, #2, p. 236, Summer 1980.

Primary Examiner—Robert L. Lindsay, Jr.
Attorney, Agent, or Firm—Thomas H. Jones; John R. Manning

[57] ABSTRACT

A method of forming hollow glass spheres S shaped by the effects of surface tension acting on bubbles of glass in its molten state; the method is characterized by the steps of establishing a downwardly flowing stream of air accelerated at a one-G rate of acceleration through a drop tower 10, introducing into the stream of air free-falling bubbles B of molten glass, and freezing the bubbles in the stream as they are accelerated at a one-G rate of acceleration.

6 Claims, 1 Drawing Figure

METHOD OF FORMING FROZEN SPHERES IN A FORCE-FREE DROP TOWER

ORIGIN OF THE INVENTION

The invention described herein was made in the performance of work under a NASA Contract and is subject to the provisions of Section 305 of the National Aeronautics and Space Act of 1958, Public Law 85-568 (72 STAT. 435; 42 U.S.C. 2457).

BACKGROUND OF THE INVENTION

1. Field of the Invention

The invention generally relates to methods for forming frozen hollow spheres and more particularly to an improved method of utilizing a drop tower for forming hollow glass spheres in the absence of shape-distorting effects of aerodynamic drag.

2. Description of the Prior Art

Since thermo-nuclear fusion is an extremely important segment of scientific endeavor, laboratory experiments are continuously being conducted in this field. One area of fusion research, known as inertia-confinement, has received much attention from those experimentors currently employed in this endeavor. In this area, electronic means are finding a prominent place among the drivers being proposed.

Briefly, inertial-confinement is attained by radiating a target with extremely high intensity beams such as, for example, laser, ion, and electron beams. Such a beam of radiation is applied over a very short time span, such as 100 pico seconds, for example. The targets employed preferably comprise hollow spherical shells of glass filled with deuterium and tritium. Conversion of the target surface to plasma occurs in about 10 pico seconds, causing inward compression of thermo-nuclear fuel contained in the spheres. The mass of fuel is burned at its center as a result of the implosion where the compression is high enough. Compression to more than 1,000 times liquid density is desired for reasonable reactor-target design. Currently, reactors tend to need approximately 50% fuel burned in order to be considered efficient. Spherical glass shells are considered, currently, to comprise the best primary fuel containers for targets, in a laser fusion process, because of their high strength and low permeability.

Presently, the spheres employed as research targets are characterized by an outside diameter of approximately 100 micrometers and a shell thickness of approximately 1 micrometer. However, reactor target sizes ranging from one to ten millimeters in diameter have been considered. Glass shells with aspect ratios, that is to say, having outside diameters to wall thickness as high as 500-1 have been produced. However, as is well known, as the aspect ratio increases, the yield of high-quality shells tends to diminish. Therefore, one of the major problems facing those currently involved in research of the type aforementioned, is how to obtain a sufficiently high yield of spheres having the precise sphericity and concentricity needed to facilitate a desired enhanced efficiency.

During the course of a preliminary search conducted for the instant invention, the patents discovered are listed on the enclosed "List Of Prior Art Cited By Applicant".

The patent to Kassel U.S Pat. No. 2,738,548 discloses a pellet-forming apparatus in which globs of molten material are dropped into a flow of liquid flowing in the same direction as the molten material. The patentee there was concerned with a method of manufacturing pellets in which is included the step of dropping successive pellet-globules from an orifice downwardly through a closely confining tubular film of cooling fluid for thus cooling the globule. It is noted that the molten globules fall successively through a ring-like or tubular fluid film such that the globules are cooled relatively rapidly by the fluid comprising the film. The fluid film is vaporized to provide steam or vapor directly below the leading edge or bottom portion of the globules. The steam or vapor, in turn, tends to provide a slowing of the rate of fall or descent for each of the globules whereby the globules and resulting pellets are maintained within the length of tubular film for a longer period of time than they would be if they were to fall entirely freely without encountering the cushioning effect resulting from the rising counter current flow of steam. Additionally, there is provided a steam collecting zone for providing upward flow of steam through the tube, with respect to the molten globules and pellets. Such necessarily results in out-of-round pellets. It is therefore believed that the patentee Kassel fails to disclose or suggest the invention hereinafter more fully described and claimed.

The patent to Laehder U.S. Pat. No. 3,059,280 is believed to be of interest in that this patent discloses a system for forming urea prills wherein a downwardly moving stream of air is used to cool and solidify the prills in a prilling tower, however, it also is clear that the patentee Laehder fails to suggest the use of a drop tower wherein a stream of downwardly flowing air is accelerated at precisely one-G in order to overcome the effects of otherwise encountered aerodynamic drag.

The remaining patents to Robinson, Haas et al, Faulkner and Landis also are believed to be of interest. However it is believed that these patents fail to suggest applicant's invention as hereinafter more fully described and claimed.

For example, the patent to Robinson discloses in a glass bead-making furnace converging structure for an air-stream flowing in a direction of a smaller area; the patent to Haas et al discloses a method wherein gel microspheres are prepared by passing a stream of material into an organic drying liquid stream at an angle to its direction of flow to effect a high shearing force in droplet formation; the patent to Landis discloses a formation of urea droplets using a downwardly flowing gas stream in a prill tower, and then cooling the collected prills thus formed in a fluidized bed having a second gas stream flowing in a counter current direction relative to the prill; and the patentee Faulkner discloses a method and apparatus for making fibers.

It is therefore, the general purpose of the instant invention to provide a method for forming uniformly shaped glass spheres characterized by precise sphericity and concentricity in a terrestrial, substantially zero-G environment.

OBJECTS AND SUMMARY OF THE INVENTION

It is an object of the instant invention to provide an improved method for forming spheres from plasticized materials.

It is another object to provide an improved method of forming hollow glass spheres shaped by the effects of surface tension acting on bubbles of glass in a molten state.

It is another object to provide an improved method wherein an aerodynamically drag-less environment is established in a drop tower, at one atmosphere, for purposes of accommodating formation of spherical bodies.

These and other objects and advantages are achieved through a method wherein bubbles of molten material are deposited in a downwardly flowing stream of air accelerated at precisely one-G, whereby the known effects of aerodynamic resistence are avoided, in a positive one atmosphere environment, as will become more readily apparent by reference to the following description and claims in light of the accompanying drawings.

DESCRIPTION OF THE DRAWING

The drawing comprises a perspective view of an apparatus provided for performing a method embodying the principles of the instant invention.

DESCRIPTION OF THE PREFERRED EMBODIMENT

Figure 1:
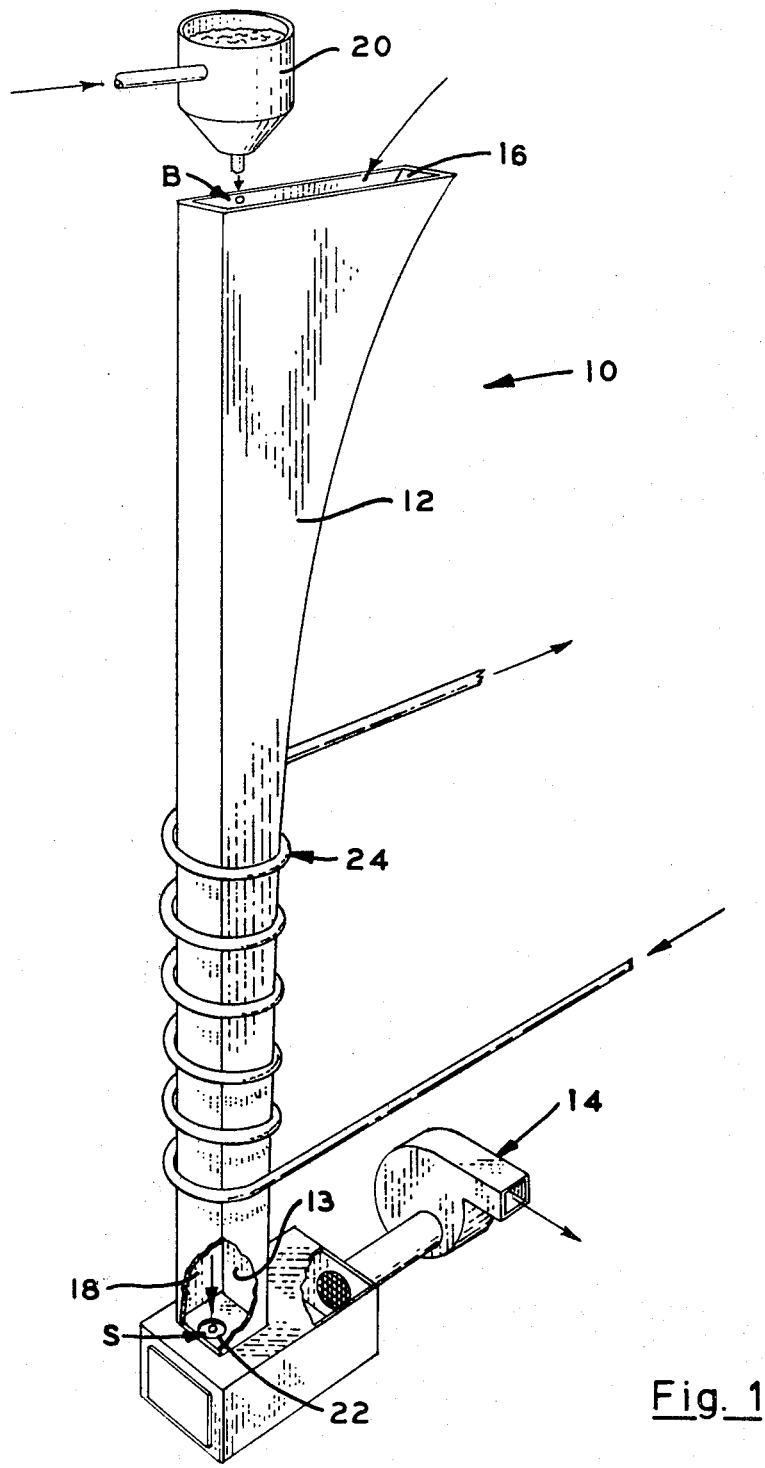

Referring now to the drawing with more particularity, there is shown a drop tower, generally designated 10, particularly suited for performing a method embodying the principles of the instant invention.

As shown in the drawing, the drop tower 10 includes a vertically oriented tubular body 12 having an internal passageway 13 connected with a suction fan, or evacuation pump, designated 14. As shown in the drawing, the passageway 13 opens in an expanded mouth, designated 16. The mouth 16 is located at the upper end thereof and terminates in a restricted throat 18. Thus the passageway 13 is suitably shaped for accommodating downward acceleration, at one-G of atmospheric air drawn therethrough so that the stream of air drawn through the passageway 13 is characterized by a velocity which exactly equals that of the velocity of any object falling through the passageway.

As shown in the drawing, a bubble generator 20 is positioned above the mouth 16, provided for the passageway 13. The bubble generator is used for the purpose of introducing into the passageway free-falling bubbles of molten glass. Since the bubble generators 20 are known and the details thereof form no part of the invention hereinafter claimed, a detailed description of the generator 20 is omitted in the interest of brevity. It suffices, however, to understand that free-falling bubbles B of molten materials such as glass are introduced into the passageway 13, via the mouth 16, and that the bubbles are permitted to gravitate downwardly through the passageway to be received in a delivery opening, designated 22, as solid glass spheres, designated S. Preferably, the opening 22 is formed in a separator plate formed of a mesh or screen-like material.

It should now be apparent that the bubbles or droplets B gravitate or fall at exactly a one-G rate of acceleration, precisely the rate of acceleration for the stream of air drawn through the mouth 16. Thus the bubbles, or droplets B, experience no aerodynamic drag due to the relative velocity thereof. Consequently, forces of surface tension acting on the bubbles or droplets draw the bubbles into substantially perfect spheres which, when cooled, comprise solid, hollow spheres.

In order to freeze the spheres by permitting the molten glass, or other materials, to give up heat through radiation, convection and/or conduction, the tubular body 12 preferably is of a sufficient height to permit the bubbles to fall for a period of time of sufficient duration to give up their heat and thus freeze into spherical configurations. Where desired, the tubular body 12 may be concentrically related to a cooling coil, generally designated 24, through which is circulated a suitable refrigerant. Moreover, where so desired, the air drawn through the mouth 16 for the passageway 13 may be pre-cooled. Additionally, and as so desired, it is possible to agitate the air within the passageway 13, in a manner not here discussed, for further effecting an exchange of temperature between the surfaces of the tubular body 12 and the bubbles B falling through the passageway.

It should, at this juncture, readily be apparent that while the instant invention provides a method which is particularly suited for forming hollow glass spheres, the method is equally applicable in methods employed in forming hollow spheres of other materials, including ceramics and metals.

In view of the foregoing, it is to be understood that the method embodying the principles of the instant invention provides a practical solution to many of the problems heretofore encountered by those engaged in the design of apparatus and methods intended for use in forming frozen spheres in terrestrial environments, particularly in laboratory environments.

What is claimed is:

1. A method of forming solid spheres from a hardenable liquid material, the steps comprising:
    A. establishing a flowing stream of gaseous fluid with said stream flowing in a substantially vertical downward direction;
    B. introducing droplets of hardenable liquid material into said stream with the droplets accelerating in the direction of said stream and at a common rate of acceleration with said stream, which rate is substantially one-G; and
    C. cooling said droplets a sufficient amount within said stream to harden said droplets.

2. A method as defined in claim 1 in which said droplets comprise bubbles.

3. A method as defined in claims 1 or 2 wherein said fluid comprises ambient air and said material comprises molten glass.

4. A method as defined in claims 1 or 2 wherein said stream of fluid comprises a stream of ambient air drawn at a one-G rate of acceleration vertically downwardly through a cooled drop tower, and said droplets of material comprises free-falling bubbles of molten glass.

5. A method as defined in claims 1 or 2 wherein said stream of fluid comprises a stream of gas downwardly accelerated through a drop tower, and said droplets of material comprise hollow, free-falling droplets of glass characterized by a capability of being frozen in said stream.

6. A method for forming hollow glass spheres shaped by the effects of surface tension acting on bubbles of glass in its molten state comprising the steps of:
    A. establishing a downwardly flowing stream of air accelerated at a one-G rate of acceleration;
    B. introducing into said stream of air free-falling bubbles of molten glass; and
    C. freezing the bubbles in the stream as they are accelerated at a one-G rate of acceleration.

* * * * *